(12) United States Patent
Pagan

(10) Patent No.: US 10,067,774 B2
(45) Date of Patent: Sep. 4, 2018

(54) APPLICATION BAR BROWSING OF TABBED VIEW APPLICATIONS

(71) Applicant: International Business Machines Corporation, Armonk, NY (US)

(72) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/818,345

(22) Filed: Nov. 20, 2017

(65) Prior Publication Data

US 2018/0074832 A1    Mar. 15, 2018

Related U.S. Application Data

(63) Continuation of application No. 14/680,937, filed on Apr. 7, 2015, now Pat. No. 9,858,089, which is a continuation of application No. 11/770,294, filed on Jun. 28, 2007, now Pat. No. 9,003,321.

(51) Int. Cl.
| | |
|---|---|
| *G06F 3/048* | (2013.01) |
| *G06F 9/451* | (2018.01) |
| *G06F 3/0484* | (2013.01) |
| *G06F 3/0481* | (2013.01) |
| *G06F 9/44* | (2018.01) |

(52) U.S. Cl.
CPC ............ *G06F 9/451* (2018.02); *G06F 3/0481* (2013.01); *G06F 3/04842* (2013.01); *G06F 9/4443* (2013.01)

(58) Field of Classification Search
CPC ... G06F 3/0481; G06F 3/04842; G06F 9/4443
See application file for complete search history.

(56) References Cited

U.S. PATENT DOCUMENTS

| | | | |
|---|---|---|---|
| 6,756,999 B2 | 6/2004 | Stoakley et al. | |
| 7,010,755 B2 | 3/2006 | Anderson et al. | |
| 7,047,499 B2 | 5/2006 | Ferri | |
| 2003/0107593 A1 | 6/2003 | Domenico | |
| 2004/0000664 A1 | 1/2004 | Cirne | |
| 2004/0113948 A1* | 6/2004 | Shahrbabaki | G06F 3/0483 715/777 |

(Continued)

FOREIGN PATENT DOCUMENTS

WO    WO 0146790    6/2001

*Primary Examiner* — Thanh Vu
(74) *Attorney, Agent, or Firm* — Steven M. Greenberg, Esq.; CRGO Law

(57) ABSTRACT

Embodiments of the present invention address deficiencies of the art in respect to tabbed browsing and provide a method, system and computer program product for application bar browsing of tabbed-view applications. In one embodiment of the invention a method for application bar browsing of tabbed-view applications can be provided. The method can include populating a pop-up list for a consolidated application bar entry for multiple different instances of a single application with corresponding entries each for a different one of the multiple different instances of the single application. The method further can include associating at least one of the entries in the pop-up list with an instance of the single application configured for tabbed browsing. The method yet further can include configuring the associated at least one of the entries with a tabbed browser view.

10 Claims, 2 Drawing Sheets

(56) References Cited

U.S. PATENT DOCUMENTS

| | | |
|---|---|---|
| 2005/0198584 A1 | 9/2005 | Matthews et al. |
| 2006/0184537 A1 | 8/2006 | Sauve et al. |
| 2006/0224989 A1* | 10/2006 | Pettiross ............... G06F 3/0481 715/779 |
| 2007/0157099 A1* | 7/2007 | Haug .................... G06F 3/0486 715/769 |
| 2008/0052642 A1 | 2/2008 | Champion et al. |

* cited by examiner

APPLICATION BAR BROWSING OF TABBED VIEW APPLICATIONS

CROSS-REFERENCE TO RELATED APPLICATIONS

This application is a Continuation of U.S. application Ser. No. 14/680,937, filed Apr. 7, 2015, which is a Continuation of U.S. application Ser. No. 11/770,294, filed Jun. 28, 2007, the entirety of each which is incorporated herein by reference.

BACKGROUND OF THE INVENTION

Field of the Invention

The present invention relates to the field of the graphical user interface (GUI) and more particularly to tabbed views of content browser content.

Description of the Related Art

The conventional graphical user interface (GUI) has been widely used for many years. The primary function of the GUI includes providing visual controls with which the end-user can interact with an underlying application. Though the common GUI includes many stock visual controls, a select few visual controls can be combined to accommodate most computer-human interactions required by an application. For example, the static text box control can be used to present text to the end-user while an edit box can permit the user to provide textual input to the application. A radio button control can provide for the exclusive selection of an element from among a field of elements, while a checklist box can control can provide for the non-exclusive selection of elements from among a field of elements.

User interface controls ordinarily provide a visual interface which permits some sort of user interactivity, such as a mouse click for a button or check box, and an insert caret for a text field. With respect to a content browser such as a Web browser, user interface controls are provided both in connection with the operation of the content browser itself, for instance through menu bars and tool bars, and also in connection with the navigation of content rendered within the content browser. Older forms of the content browser permitted the viewing of a single page of content at a time, though multiple pages can be opened in multiple different instance of the content browser and accessed through the "Window" menu item of the menu bar for the content browser. New forms of the content browser, however, permit tabbed browsing.

Tabbed browsing refers to the rendering of different content pages in different views arranged according to a "tabbed notebook" paradigm. In the tabbed notebook paradigm, a small tab section can be placed above a content view section in which the content of a selected tab is displayed. The activation of another tab can result in the display of associated content in the content view section. The entirety of the tabs, however, can be compartmentalized in a single content browser instance, eliminating the need to generate multiple content browser instances and the need to needlessly consume excess computing resources to support the multiple content browser instances. Of course, the placement of multiple content browser instances in a computing desktop can result in unwanted clutter.

Generally speaking, identifying an application window in a cluttered computing desktop can be challenging in the presence of multiple application windows placed on the computing desktop. To address the problem of application window clutter, the modern computing desktop provides for an application bar in which entries in the application bar correspond to an application window displayed in the computing desktop either in a maximized mode, a minimized mode, or a normalized mode as will be recognized by the skilled artisan. The selection of an entry in the application bar results in the activation of the corresponding application in the computing desktop and the setting of focus to the corresponding application.

When an application in the computing document includes a configuration to edit documents, multiple documents can be opened for editing in the single application, and for some applications, multiple different instances of the application can be rendered in the computing desktop. However, in the latter circumstance, in the application bar only a single entry will be provided for the application despite the number of different instances. Rather, a numerical indicator can be provided in the entry indicating how many documents are opened for editing in connection with the application. Moreover, a selection of the entry in the application bar will result in a pop-up window listing the different titles for the different documents opened for editing in the application.

Notably, the behavior of the application bar does not differ for an application configured for tabbed browsing. In this regard, so long as only a single instance of the application is present in the computing desktop, only a single entry in the application bar will be provided, even where multiple tabs are open for the single instance. Moreover, where multiple instances of the application are present in the computing desktop, some of which included multiple tabs, the titles of the different instances of the application will be presented in the pop-up window. Yet, the titles of the different tabs in the different instances of the application will not be presented in the pop-up window. Rather, only the active tab in each of the instances will be presented in the pop-up window. As a result, to view the different tabs, first the host application instance must be activated through the pop-up window and then the different tabs must be activated to identify the content of any given tab.

BRIEF SUMMARY OF THE INVENTION

Embodiments of the present invention address deficiencies of the art in respect to tabbed browsing and provide a novel and non-obvious method, system and computer program product for application bar browsing of tabbed-view applications. In one embodiment of the invention a method for application bar browsing of tabbed-view applications can be provided. The method can include populating a pop-up list for a consolidated application bar entry for multiple different instances of a single application with corresponding entries each for a different one of the multiple different instances of the single application. The method further can include associating at least one of the entries in the pop-up list with an instance of the single application configured for tabbed browsing. The method yet further can include configuring the associated at least one of the entries with a tabbed browser view.

In another embodiment of the invention, a user interface data processing system can be configured for application bar browsing of tabbed-view applications. The system can include an application bar for an operating system executing in host computing platform and a pop-up list for an entry in the application bar. Each item in the pop-up list can correspond to a different instance of an application associated with the entry. Finally, a tabbed browser view can be coupled to an item in the pop-up list corresponding to an instance of the application configured for tabbed browsing. In one aspect of the embodiment, the tabbed browser view can be a cascaded menu, each item in the menu corresponding to an inactive tab in the instance of the application configured for tabbed browsing. In another aspect of the embodiment, the tabbed browser view can be a tab iterator enabled to iterate amongst tabs in the instance of the application configured for tabbed browsing.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for application bar browsing of tabbed-view applications. In accordance with an embodiment of the present invention, an entry can be included in a pop-up list for an application bar entry for an application instance providing for tabbed browsing of content. The entry in the pop-up list can be configured with a tab browser view. The tabbed browser view can include, for example, a cascading menu. The entries in the cascading menu can be associated with the different tabs in the application instance providing for tabbed browsing. Alternatively, the tabbed browser view can include a tab iterator enabled to iterate a display of different tabs for the entry in the pop-up list. In this way, one can identify the content of different tabs in an application instance without first activating the application instance through the pop-up list.

Figure 1A:
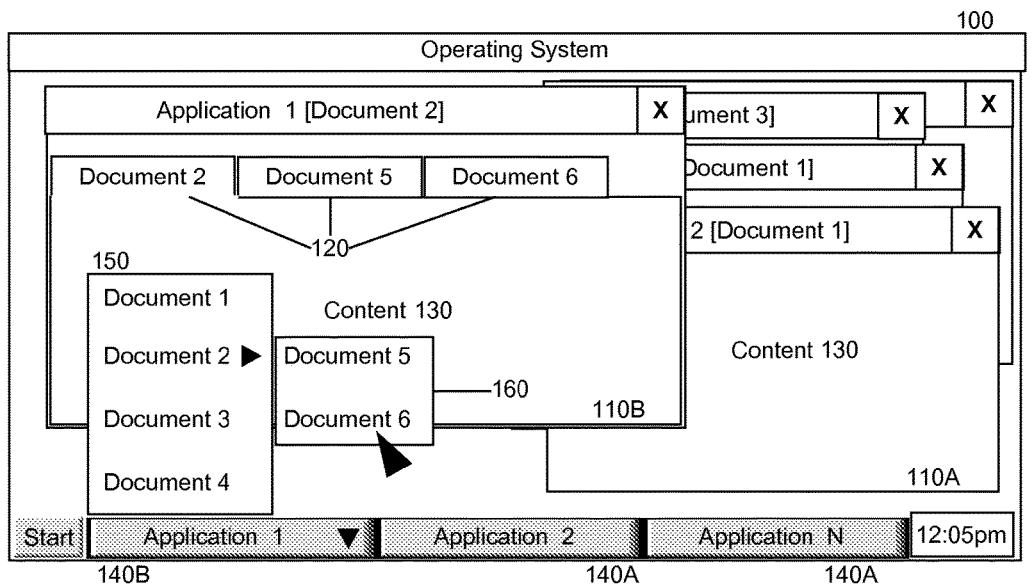
FIG. 1A is a screen shot of a user interface data processing system configured for application bar browsing of tabbed-view applications.

In further illustration, FIG. 1A is a screen shot of a user interface data processing system configured for application bar browsing of tabbed-view applications. As shown in FIG. 1A, an operating environment 100 can support the execution of one or more applications. Each executing application can include a corresponding application bar entry 140A, 140B. The executing applications can include both individual instances of an application 110A and also instances of a tabbed browser configured application 110B. In the former circumstance, content 130 can be presented within the singular view of the individual application instance 110A, whereas in the latter circumstance, content 130 can be separately presented in different tabbed views 120 of the tabbed browser configured application 110B.

Notably, for each single instance of an executing application, a corresponding single application bar entry 140A can be provided. In contrast, for multiple instances of an executing application, a single consolidated application bar entry 140B can be provided and configured with an activatable pop-up list 150. The entries in the activatable pop-up list 150 can refer to the content 130 of each different instance 110A, 110B of the executing application. Furthermore, for a tabbed browser configured application 110B, the entry in the activatable pop-up list 150 can reflect an active one of the tabs 120 of the tabbed browser configured application 110B. Moreover, a tabbed browser view 160 can be provided for the inactive ones of the tabs 120 of the tabbed browser configured application 110B.

Figure 1B:
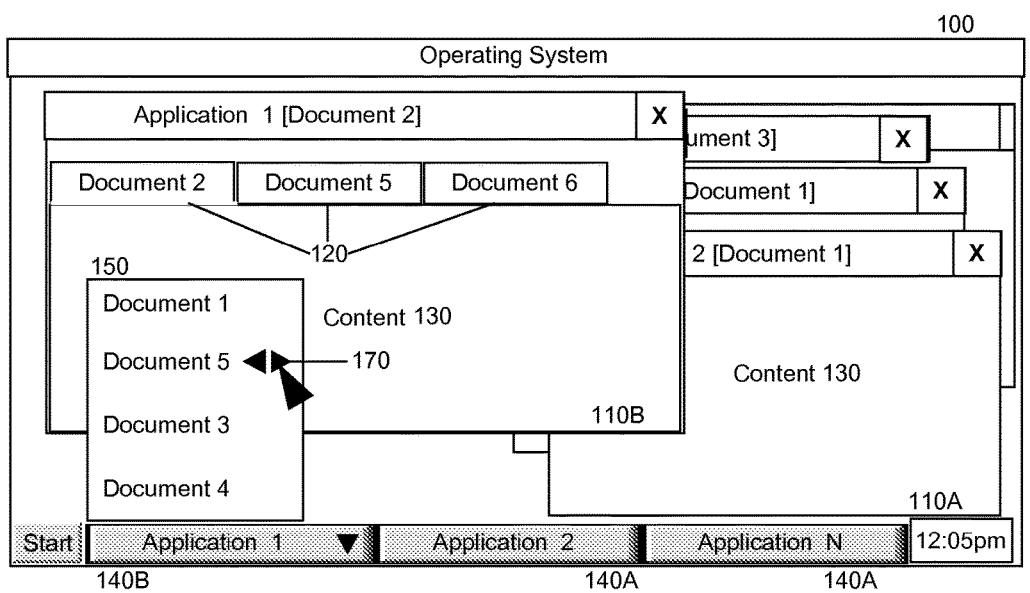
FIG. 1B is a screen shot of a user interface data processing system configured for application bar browsing of tabbed-view applications.

For example, as shown in FIG. 1A the tabbed browser view 160 can be a cascading menu of inactivate ones of the tabs 120. Alternatively, as shown in FIG. 1B, the tabbed browser view 170 can be a tab iterator enabled to iterate the entry in the pop-up list 150 with a title for a different one of the tabs 120 in the tabbed browser configured application 110B. In either case, the title of the view for the different one of the tabs 120 in the tabbed browser configured application 110B can be revealed to an end-user without requiring the end user to activate the tabbed browser configured application 110B in the operating system 100 and to cycle through the different tabs 120.

Figure 2:
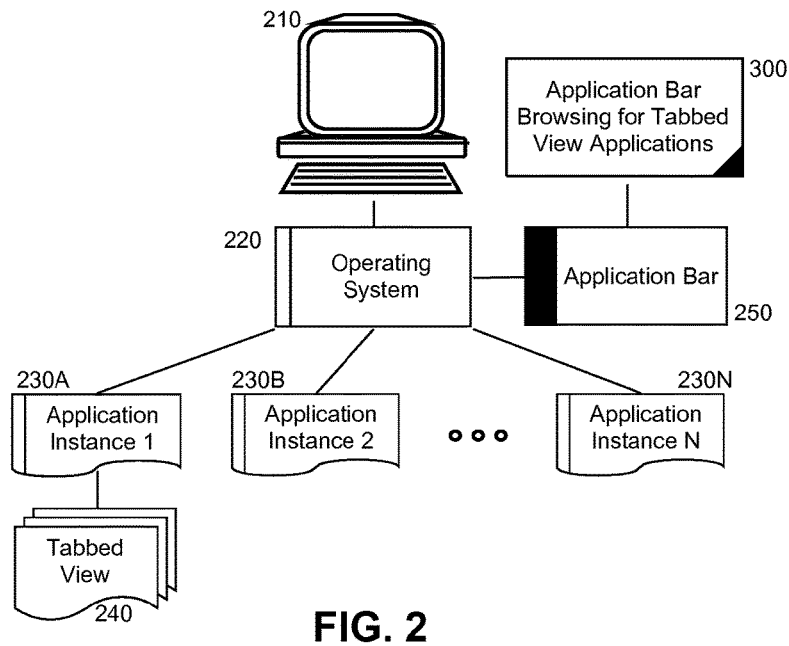
FIG. 2 is a schematic illustration of a user interface data processing system configured for application bar browsing of tabbed-view applications; and, FIG. 3 is a flow chart illustrating a process for application bar browsing of tabbed-view applications.

In yet further illustration, FIG. 2 is a schematic illustration of a user interface data processing system configured for application bar browsing of tabbed-view applications. The system can include a host computing platform 210 configured to host an operating system 220. The operating system 220 in turn can be configured to support the operation of one or more application instances 230A, 230B, 230N. At least one application instance 230A can provide a tabbed view of content 240. Notably, the operating system 220 can include an application bar 250. The application bar 250 in turn can be coupled to logic for application bar browsing for tabbed view applications 300. The logic can include program code enabled to provide a tabbed browser view for a pop-up list for an entry in the application bar 250 corresponding to the application instance 230 providing a tabbed view of content 240.

Figure 3:
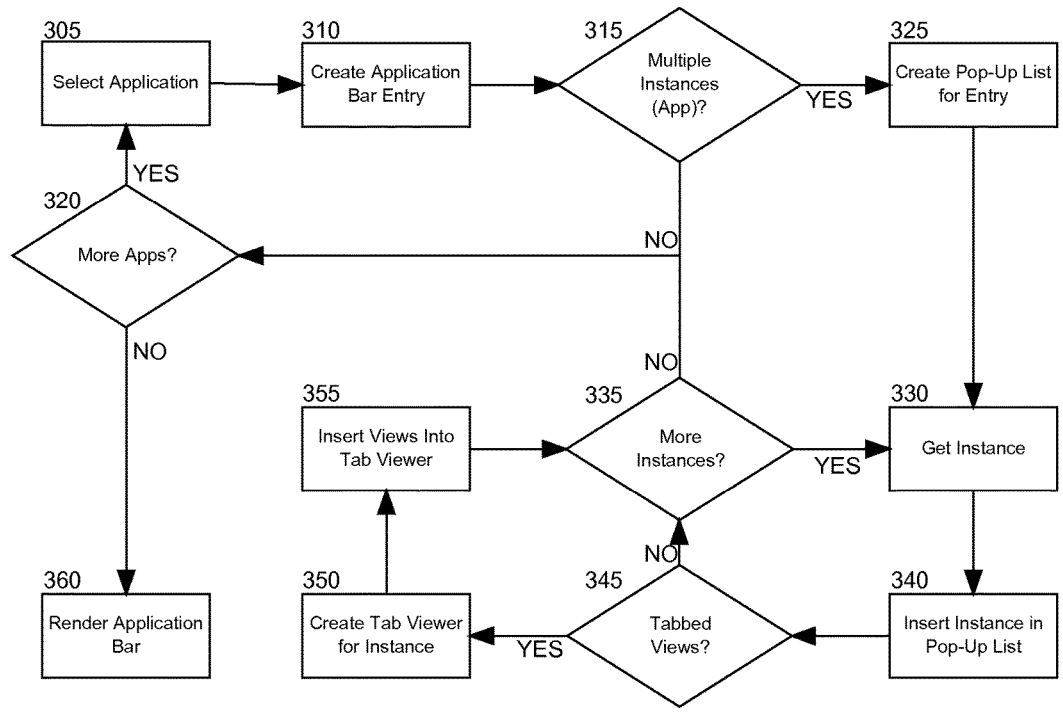

To that end, FIG. 3 is a flow chart illustrating a process for application bar browsing of tabbed-view applications. Beginning in block 305, an application executing in the operating environment can be selected and in block 310 an application bar entry can be created in the application bar for the selected application. In decision block 315, it can be determined whether multiple instances of the application execute in the operating environment. If not, in decision block 320 it can be determined whether additional applications execute in the operating environment. If so, the process can repeat in block 305 and a next application executing in the operating environment can be selected. Otherwise, the process can end in block 360 with the application bar being rendered in the operating environment.

In decision block 315, if it is determined that multiple instances of an application execute in the operating environment, in block 325 a pop-list can be created for the entry in the application bar. Thereafter, in block 330 a first instance of the application can be selected and a reference to the first instance can be inserted into the pop-up list in block 340. In decision block 345, it can be determined whether the instance of the application provides tabbed views of content. If so, in block 350 a tabbed browser view can be created for the different tabs in the instance of the application and in block 355 references to each of the different tabs can be placed in the tabbed browser view. Finally, in decision block 335 it can be determined if additional instances remain to be processed for the application. If so, the process can repeat through block 330. Otherwise, the process can continue in block 320 as before.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for application bar browsing of tabbed-view applications, the method comprising:

creating in memory of a computer, a graphical user interface (GUI) desktop;

configuring an application bar in the GUI, the application bar comprising a set of application bar entries each corresponding to a different application, each responding to a selection thereof by activating a view in the user interface for a corresponding one of the different applications to the exclusion of other views for others of the different applications in the user interface;

populating a pop-up list for one of the application bar entries for multiple different instances of a single one of the different applications with corresponding entries in the pop-up list, each entry for respectively associated with a different one of the multiple different instances of the single one of the different applications;

associating at least one of the entries in the pop-up list with an active tab amongst multiple tabs within one of the instances of the single one of the different applications that is configured for tabbed browsing, but omitting from the pop-up list other inactive tabs amongst the multiple tabs;

providing a navigation element adjacent to each of the entries, the navigation element responding to a selection by selecting for display in the GUI a sequentially next instance of the single application;

rendering the GUI in a display of the computer; and, responsive to a selection of a navigation element for one of the entries in the pop-up list corresponding to one instance of the single one of the different applications, selecting for display in the GUI a sequentially next instance of the single one of the different applications.

2. The method of claim 1, further comprising configuring the associated at least one of the entries with a cascaded menu of items each corresponding to an inactive tab in the single application configured for tabbed browsing.

3. The method of claim 2, wherein configuring the associated at least one of the entries with a tabbed browser view, comprises configuring the associated at least one of the entries with a tab iterator enabled to iterate the associated at least one of the entries from tab to tab in the single application configured for tabbed browsing.

4. A user interface data processing system configured for application bar browsing of tabbed-view applications, the system comprising:

a host computing platform comprising at least one processor and memory coupled to a display; and, an application browser bar module executing in the host computing platform;

the application browser bar module comprising program code enabled upon execution in the host computing platform to perform:

creating in memory of a computer, a graphical user interface (GUI) desktop;

configuring an application bar in the GUI, the application bar comprising a set of application bar entries each corresponding to a different application, each responding to a selection thereof by activating a view in the user interface for a corresponding one of the different applications to the exclusion of other views for others of the different applications in the user interface;

populating a pop-up list for one of the application bar entries for multiple different instances of a single one of the different applications with corresponding entries in the pop-up list, each entry for respectively associated with a different one of the multiple different instances of the single one of the different applications;

associating at least one of the entries in the pop-up list with an active tab amongst multiple tabs within one of the instances of the single one of the different applications that is configured for tabbed browsing, but omitting from the pop-up list other inactive tabs amongst the multiple tabs;

providing a navigation element adjacent to each of the entries, the navigation element responding to a selection by selecting for display in the GUI a sequentially next instance of the single application;

rendering the GUI in a display of the computer; and, responsive to a selection of a navigation element for one of the entries in the pop-up list corresponding to one instance of the single one of the different applications, selecting for display in the GUI a sequentially next instance of the single one of the different applications.

5. The system of claim 4, further comprising a tabbed browser view coupled to an item in the pop-up list, wherein the tabbed browser view is a cascaded menu, each item in the menu corresponding to an inactive tab in the instance of an application configured for tabbed browsing.

6. The system of claim 5, wherein the tabbed browser view is a tab iterator enabled to iterate amongst tabs in the instance of the application configured for tabbed browsing.

7. The system of claim 5, wherein the application configured for tabbed browsing is a Web browser.

8. A computer program product comprising a non-transitory computer usable medium embodying computer usable program code for application bar browsing of tabbed-view applications, the computer program product comprising:

computer usable program code for creating in memory of a computer, a graphical user interface (GUI) desktop;

computer usable program code for configuring an application bar in the GUI, the application bar comprising a set of application bar entries each corresponding to a different application, each responding to a selection thereof by activating a view in the user interface for a corresponding one of the different applications to the exclusion of other views for others of the different applications in the user interface;

computer usable program code for populating a pop-up list for one of the application bar entries for multiple different instances of a single one of the different applications with corresponding entries in the pop-up list, each entry for respectively associated with a different one of the multiple different instances of the single one of the different applications;

computer usable program code for associating at least one of the entries in the pop-up list with an active tab amongst multiple tabs within one of the instances of the single one of the different applications that is configured for tabbed browsing, but omitting from the pop-up list other inactive tabs amongst the multiple tabs;

computer usable program code for providing a navigation element adjacent to each of the entries, the navigation element responding to a selection by selecting for display in the GUI a sequentially next instance of the single application;

computer usable program code for rendering the GUI in a display of the computer; and, computer usable program code for responding to a selection of a navigation element for one of the entries in the pop-up list corresponding to one instance of the single one of the different applications, by selecting for display in the GUI a sequentially next instance of the single one of the different applications.

9. The computer program product of claim 8, further comprising computer usable program code for configuring the associated at least one of the entries with a cascaded menu of items each corresponding to an inactive tab in the single application configured for tabbed browsing.

10. The computer program product of claim 9, wherein the computer usable program code for configuring the associated at least one of the entries with a tabbed browser view, comprises computer usable program code for configuring the associated at least one of the entries with a tab iterator enabled to iterate the associated at least one of the entries from tab to tab in the single application configured for tabbed browsing.

* * * * *